United States Patent [19]
Lynch et al.

[11] 3,776,028
[45] Dec. 4, 1973

[54] THREE-AXIS, ADJUSTABLE LOADING STRUCTURE

[75] Inventors: Edward J. Lynch, Lancaster; Darwyn T. Gray, Palmdale, both of Calif.

[73] Assignee: The United States of America as represented by the Administrator of the National Aeronautics and Space Administration, Washington, D.C.

[22] Filed: May 16, 1972

[21] Appl. No.: 253,725

[52] U.S. Cl. ............................. 73/88 R, 254/93 R
[51] Int. Cl. .............................................. G01n 3/00
[58] Field of Search .......................... 73/88 R, 103; 254/93 R

[56] References Cited
UNITED STATES PATENTS
2,096,964   10/1937   Frocht.............................. 73/88 R FOREIGN PATENTS OR APPLICATIONS
137,695   10/1960   U.S.S.R............................. 73/88 R

*Primary Examiner*—Jerry W. Myracle
*Attorney*—Darrell G. Brekke et al.

[57] ABSTRACT

A three-axis, adjustable loading structure is provided for test equipment wherein it is desired to exert pressure against the structure which is to be tested. The device of the present invention is provided with three electric drives whereby the wall angle, horizontal position, and vertical position of the test device can be rapidly and accurately positioned.

The invention described herein was made by employees of the United States Government and may be manufactured and used by or for the Government for Governmental purposes without the payment of any royalties thereon or therefor.

4 Claims, 6 Drawing Figures

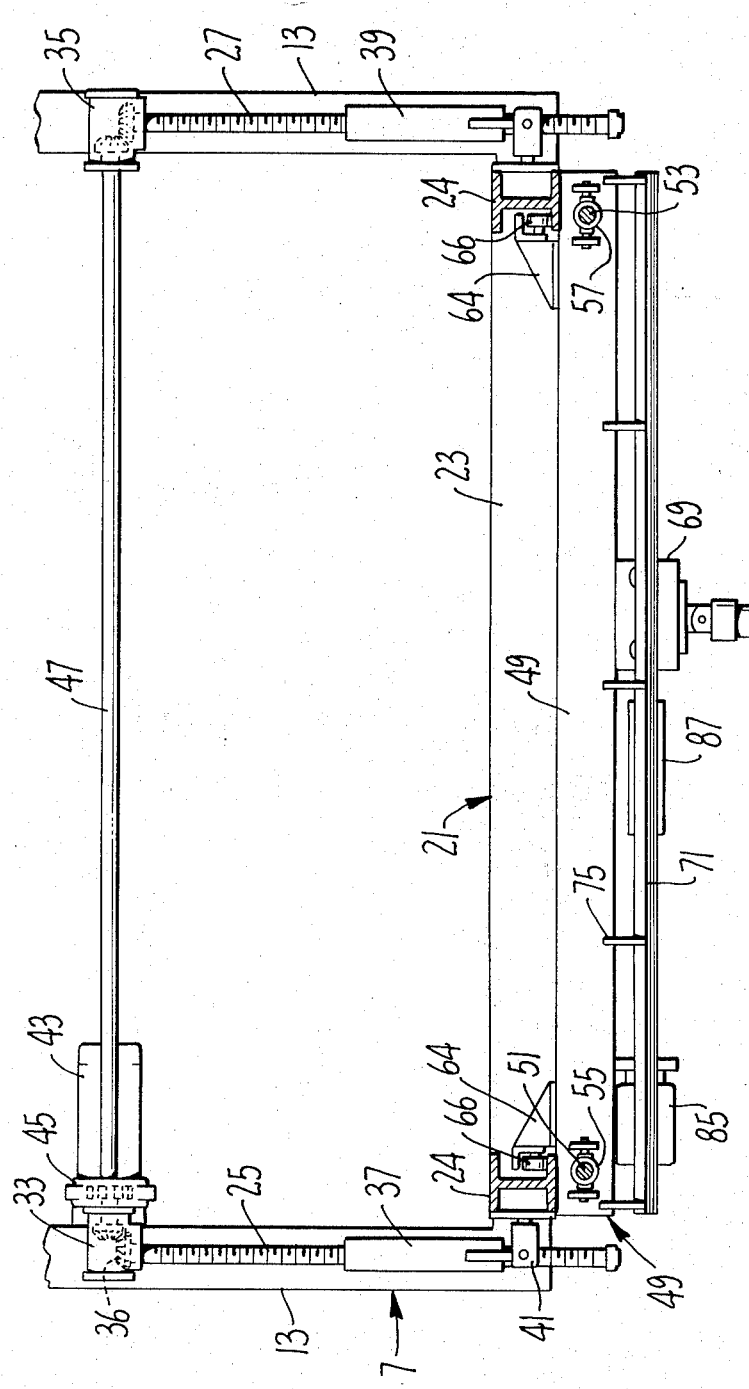
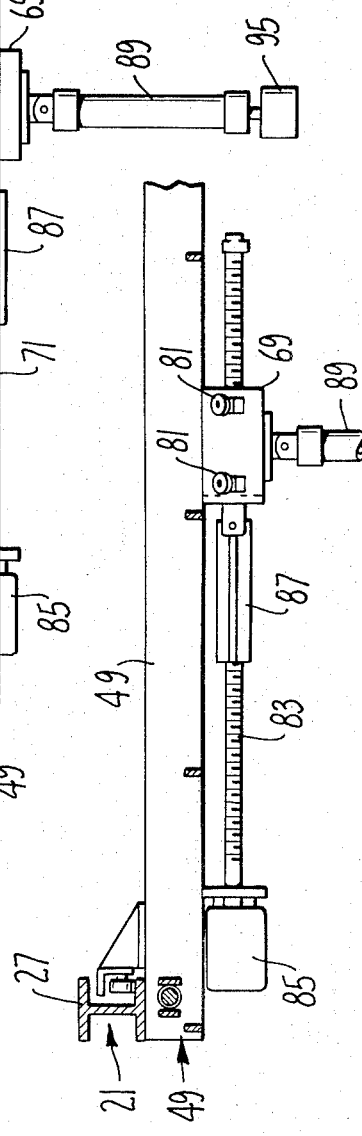
FIG. 5.
FIG. 6.

THREE-AXIS, ADJUSTABLE LOADING STRUCTURE

BACKGROUND OF THE INVENTION

1. Field of the Invention

Three-axis, loading device for test fixtures.

2. Description of the Prior Art

In testing structures such as the moving surfaces of aircraft, it was previously necessary to construct a fixed structure for each attitude as the surface was moved through various increments of its travel. This method was very cumbersome and time consuming and the test fixture was not always accurately positioned.

SUMMARY OF THE INVENTION

In testing structures, such as the movable surfaces of flight vehicles, it is necessary to impose loads on the surface and it is important that the load be applied normal to the surface. Since such tests are frequently conducted at various attitudes of the surface to be tested, it was previously necessary to provide a large number of fixtures, or to modify existing fixtures, so that in effect, one had to provide a separate fixture for each increment to be tested. This involved a number of drilling and cutting operations, since the test instrument had to be adjusted vertically and horizontally to maintain a perpendicular attitude to the surface. This also involved changing the angle of the vertical axis of the base that supported the test instrument.

In the past to make such changes in the test fixture, it required hours or even days to go from one test position to another. The device of the present invention is a three-axis loading device wherein the wall angle, the horizontal position, and the vertical position are all adjustable by means of electric motors. Thus, instead of spending many hours or days in going from one test position to another, one can achieve these changes in a matter of minutes. Furthermore, the device of the present invention permits more precise adjustment so that the results of the tests are more accurate. The device of the present invention has been estimated to save 80 to 90 percent in the set up time of going from one test position to another. The device of the present invention is simple to construct and is ruggedly built and little maintenance is required.

BRIEF DESCRIPTION OF THE DRAWINGS

In the drawings forming part of this application:

FIG. 5 is a plan view on the line 5—5 of FIG. 2.

FIG. 6 is a section on the line 6—6 of FIG. 2.

DESCRIPTION OF THE PREFERRED EMBODIMENTS

Figure 1:
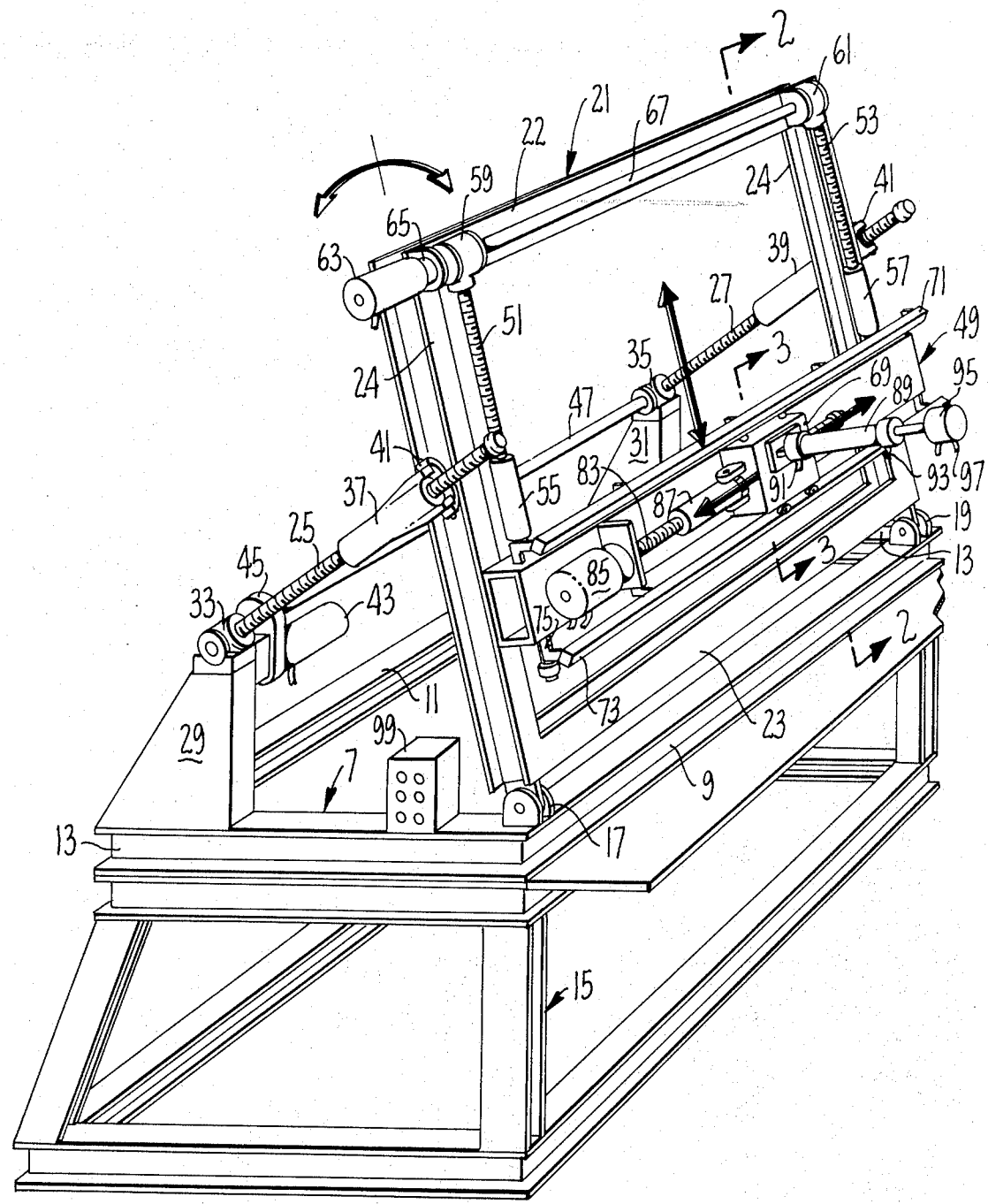
FIG. 1 is a perspective view of a device embodying the present invention.
Figure 2:
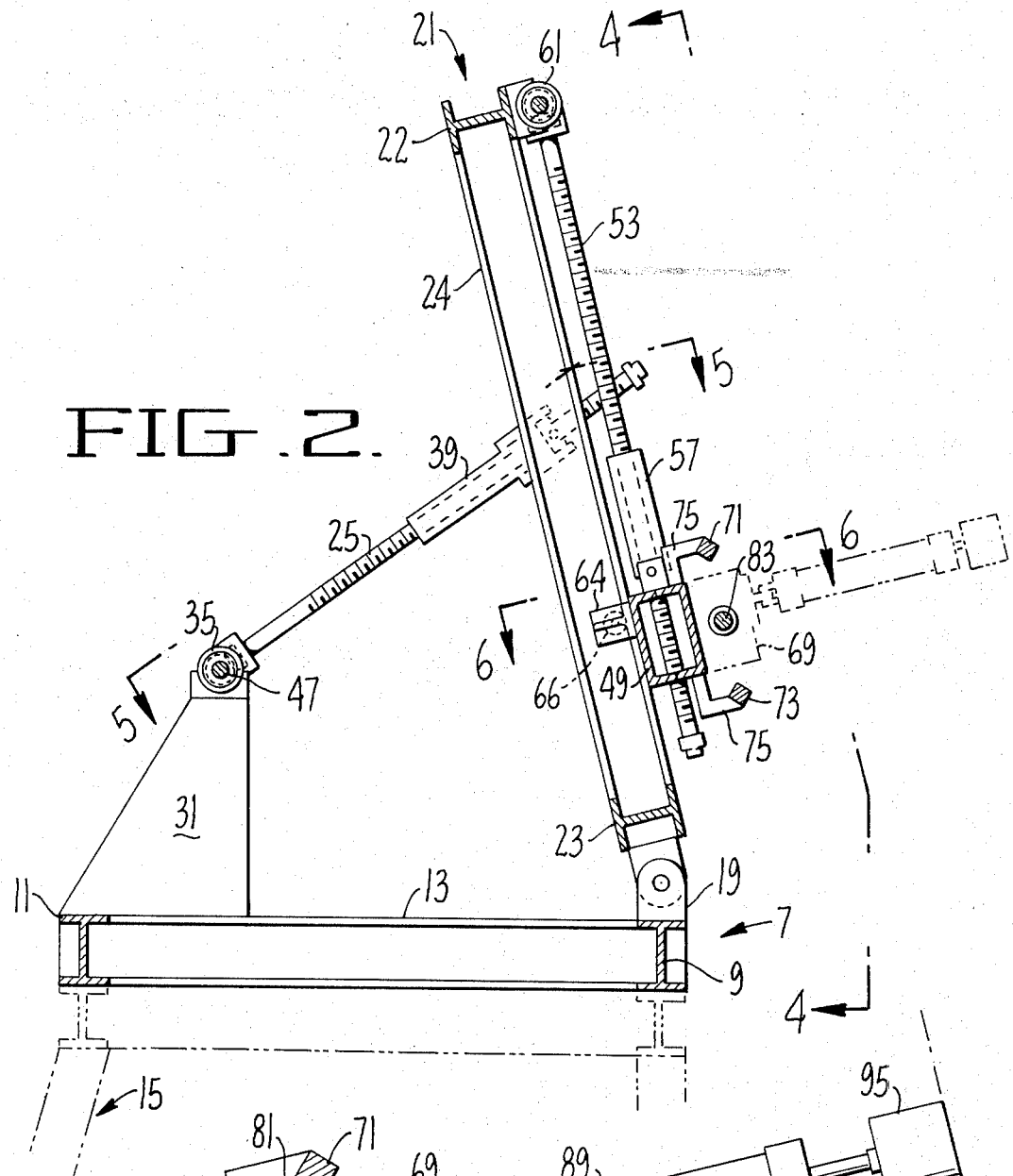
FIG. 2 is a side elevation, partly in section, on the line 2—2 of FIG. 1.

The device of the present invention includes a rectangular frame member generally designated 7, having front and back rails 9 and 11, and two side rails designated 13. Frame 7 can be bolted to a floor or other supporting structure or it can be fastened to a sub-frame section, generally designated 15, to elevate it to a suitable height. The subframe may be mounted for rotation.

Two hinge members 17 and 19 are mounted on the front rail 9 and the wall member generally designated 21 is pivotally mounted on these hinge members. Wall member 21 includes a top rail 22, a bottom rail 23 and side rails 24.

In order to support wall member 21 at a desired angle and to change the angle at will, the threaded struts 25 and 27 are employed. These are mounted on frame 7 by means of the support member 29 and 31 on which are mounted the angle drive members 33 and 35 which, through the use of bevel gears, as at 36, are adapted to rotate struts 25 and 27. Struts 25 and 27 pass through threaded collars 37 and 39 respectively which are attached by means of yolks 41 to the side members 24. Yolks 41 are free to pivot on the frame 21 and also pivotally mounted with respect to the threaded collars 37 and 39. The angle drives 33 and 35 are also free to pivot on their respective mountings. Motor 43 is connected to gear box 45 and this drives shaft 47 which actuates angle drive 33 and angle drive 35. Thus, by running motor 43 in one direction or the other, the wall angle can be changed at will through the rotation of the threaded struts 25 and 27.

The test fixture proper is mounted on a cross beam, generally designated 49, which is later described in detail. Beam 49 is mounted for vertical movement on the threaded struts 51 and 53, each of which terminates in threaded collars 55 and 57 attached to the horizontal beam 49. Struts 51 and 53 are connected by means of angle drives 59 and 61 to the vertical traverse motor 63. Beam 49 slides up and down on the side members 24 and is centered and prevented from swinging outwardly by means of retaining clips 64 which are provided with rollers 66. Motor 63 is connected by means of a gear box 65 to the angle drive 59 and in turn is connected by means of shaft 67 to the angle drive 61. Thus, motor 63 can be actuated in either direction for vertical traverse of the beam 49.

Figure 3:
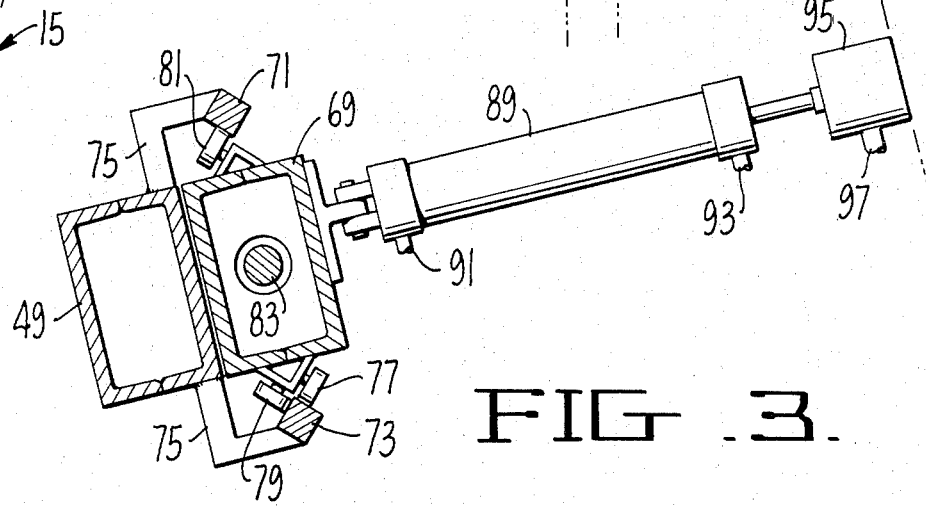
FIG. 3 is an enlarged side view, partly in section, showing the mounting of the jack pad and its supporting structure.
Figure 4:
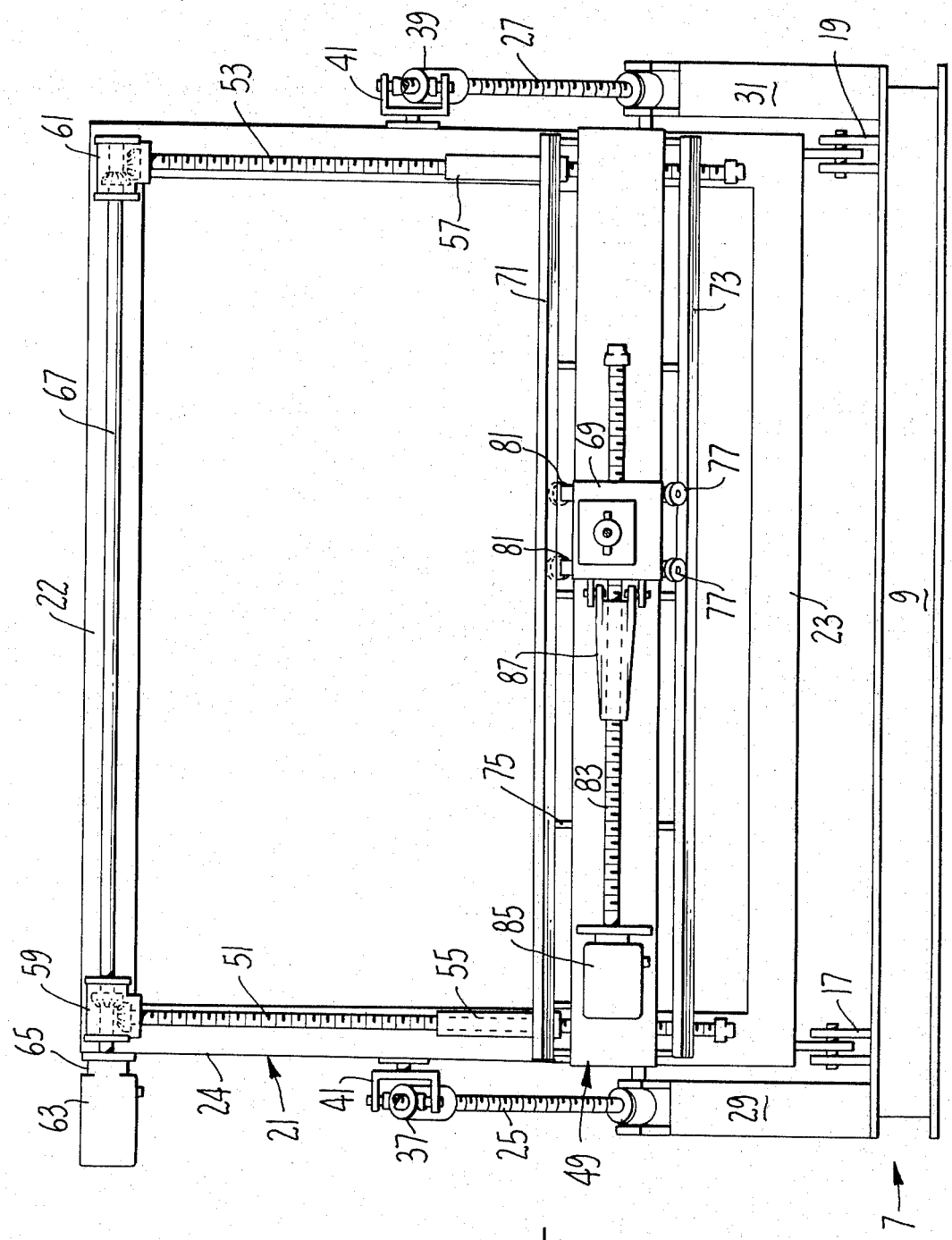
FIG. 4 is a front elevation generally on the line 4—4 of FIG. 2.

The horizontal beam 49 carries the jack pad support box 69 and this is mounted on an upper rail 71 and a lower rail 73, both of which are made of square bar stock and which are mounted with their flat surfaces at 45° to the surfaces of the horizontal beam by means of hangers 75. The jack pad is mounted (see FIG. 3) on the lower rail 73 by means of paired roller bearings, namely, front bearings 77 and rear bearings 79. However, the top of the jack pad support box is mounted on single roller bearings 81 which bear against only the rear surface of upper rail 71. The reason for this will be later explained.

To secure horizontal traverse of the jack pad support box, a threaded rod 83 passes through the box and is rotated by means of a motor 85. A threaded collar 87 is pivotally mounted on the box 69 so that by rotating the motor 85 in one direction or the other, the box 69 is cause to traverse horizontally.

The load ram 89 is fastened directly to the box 69 and is provided with suitable hydraulic connections as at 91 and 93. The load cell 95 is connected to the end of the ram and is provided with suitable electrical connections as at 97.

It was previously mentioned that the jack pad support box 69 had only a single pair of bearings at the top and that these bear against the rear surface of rail 71. The reason for this can best be seen in FIG. 3. Before a test is made, the weight of the ram 89 and the test cell 95 will cause the jack pad box to tend to rotate in a clockwise direction so that the box will rest on the bottom bearings 77 and 79 and on the top bearing 81. However, when a load is applied to the device when it is in position, the jack pad box 69 will be forced backwards into direct contact with the horizontal beam 49 which in turn will be forced into contact with the uprights 24. Thus, when the device is being used for a test, there is no load on the bearings, since the bearing 81 will be forced back from the rail 71, and the load will be applied directly against the support members 49 and 27.

An electric control box 99 is employed for actuating motor 43 to control the wall angle, motor 63 to control the vertical traverse and motor 85 to control the horizontal traverse.

It is believed apparent from the foregoing that we have provided an improved test pad which provides an adjustable loading structure which can be rapidly adjusted to accurately position the wall angle, the vertical traverse and the horizontal traverse. Thus, when testing aircraft, a minimum of time and expense are necessary when going from one configuration to another.

We claim:

1. A three-axis adjustable loading structure comprising in combination:
   a. a base frame member,
   b. a wall member mounted for pivotal motion on one edge of said frame member,
   c. adjustment means whereby said wall member can be pivoted and held in a given position,
   d. a horizontal beam mounted for vertical movement on said wall member,
   e. means for moving said beam vertically to a desired position,
   f. a jack pad support member mounted on said beam for horizontal movement and means for moving said jack pad support member horizontally along said beam, and
   g. a jack mounted on said jack pad support member.

2. The structure of claim 1 wherein a first pair of threaded struts is used to support said wall member and having motor means to drive said threaded struts.

3. The structure of claim 1 wherein said beam is mounted on said wall member by means of threaded rods and having motor means whereby said beam threaded rods are rotated to drive said in an up and down direction.

4. The structure of claim 1 wherein the jack pad support member is mounted between upper and lower rails carried by said horizontal beam, said jack pad having pairs of lower bearings in contact with both front and back surfaces of said lower rail and single upper bearings in contact with only the rear surface of the upper rail whereby a force applied to the jack pad will not be applied to said rails but said jack pad will be forced directly against said horizontal beam.

* * * * *